(12) United States Patent
Malik et al.

(10) Patent No.: US 8,027,561 B2
(45) Date of Patent: Sep. 27, 2011

(54) METHODS, DEVICES AND COMPUTER PROGRAM PRODUCTS FOR EVENT-BASED MEDIA FILE TAGGING

(75) Inventors: Dale Malik, Atlanta, GA (US); Robert Koch, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1238 days.

(21) Appl. No.: 11/509,286

(22) Filed: Aug. 24, 2006

(65) Prior Publication Data

US 2008/0126366 A1 May 29, 2008

(51) Int. Cl.
*H04N 5/77* (2006.01)

(52) U.S. Cl. .......................................... 386/225; 715/732

(58) Field of Classification Search .................... 386/46, 386/95, 124–126, 224, 225, 201, 210, 248; 715/719, 723, 732
See application file for complete search history.

(56) References Cited

U.S. PATENT DOCUMENTS

| | | | | |
|---|---|---|---|---|
| 5,633,678 A * | 5/1997 | Parulski et al. | ............ | 348/231.5 |
| 6,212,208 B1 * | 4/2001 | Yoneda et al. | ................ | 370/538 |
| 6,462,778 B1 * | 10/2002 | Abram et al. | ................ | 348/239 |
| 6,912,002 B1 * | 6/2005 | Soga | ........................... | 348/231.2 |
| 7,171,113 B2 * | 1/2007 | Parulski et al. | ............... | 396/287 |
| 7,342,604 B2 * | 3/2008 | Kito et al. | .................. | 348/231.2 |
| 7,535,495 B2 * | 5/2009 | Kitajima et al. | ........... | 348/231.2 |
| 7,639,921 B2 * | 12/2009 | Seo et al. | ....................... | 386/331 |
| 7,681,113 B2 * | 3/2010 | Takakuwa et al. | ............ | 715/201 |
| 7,739,597 B2 * | 6/2010 | Wong et al. | ................... | 715/721 |
| 2003/0174218 A1 * | 9/2003 | Battles et al. | ............. | 348/231.4 |
| 2005/0187943 A1 * | 8/2005 | Finke-Anlauff et al. | ..... | 707/100 |

FOREIGN PATENT DOCUMENTS

| | | | |
|---|---|---|---|
| EP | 1028583 | * | 8/2000 |
| GB | 2367158 | * | 9/2000 |

OTHER PUBLICATIONS

Tanebaum, Andrew, "Structured Computer Organization", p. 10-12, 1984.*

* cited by examiner

*Primary Examiner* — David Harvey
(74) *Attorney, Agent, or Firm* — Meyers Bigel Sibley Sajovec (57) ABSTRACT

Methods are provided for tagging digital media files. A digital media file is obtained with a digital media device. One or more event tags are associated with the digital media file on the digital media device responsive to a user prompt. The one or more event tags identify the digital media file. Related devices and computer program products are also provided.

9 Claims, 5 Drawing Sheets

METHODS, DEVICES AND COMPUTER PROGRAM PRODUCTS FOR EVENT-BASED MEDIA FILE TAGGING

The present invention generally relates to media devices and, more particularly, to obtaining digital media files with digital media devices and related methods and computer program products.

BACKGROUND OF THE INVENTION

As photographs taken with film cameras (or traditional cameras) take a back seat to digital photographs, due to cost, convenience and the like, the use of photo albums and photo boxes that chronologically display photos related to particular events, for example, graduations, birthdays and the like, may become a thing of the past. Digital photographs may be more convenient than traditional photographs because, for example, traditional photographs cannot typically be stored in computer files or emailed to others without first scanning them into the computer. However, conventional digital camera devices store photographs taken with the camera linearly and, therefore, may be hard to organize while stored on the digital camera device.

SUMMARY OF THE INVENTION

Some embodiments of the present invention provide methods for tagging digital media files. A digital media file is obtained with a digital media device. One or more event tags are associated with the digital media file on the digital media device responsive to a user prompt. The one or more event tags identify the digital media file.

In further embodiments of the present invention, first and second digital media files may be obtained. The first digital media file may be associated with a first event tag identifying a first category of digital media files. The second digital media file may be associated with a second event tag, different from the first event tag, identifying a second category of digital media files, different from the first category. In certain embodiments of the present invention, the first digital media file associated with the first event tag may be associated with the second event tag.

In still further embodiments of the present invention, a user of the digital media device may be prompted to select whether to associate the first digital media file with the first event tag and/or the second event tag. Similarly, the user of the digital media device may be prompted to select whether to associate the second digital media file with the first event tag and/or the second event tag.

In some embodiments of the present invention, the one or more event tags may be associated with the digital media file when the digital media file is obtained or after the digital media file is obtained.

In further embodiments of the present invention, the digital media file may associated with the one or more event tags may be associated with an audio file associated with a same at least one event tag. Two or more digital media files associated with the one or more event tags may be associated with the audio file. One or more event tags may include a time stamp associated with the audio file, the time stamp allowing the two or more digital media files to be synchronized with content of the audio file during playback. In certain embodiments of the present invention, the two or more digital media files may include a visual indication of the association with the audio file on the two or more digital media files.

In still further embodiments of the present invention, a visual indication of the one or more event tags associated with the digital media file may be provided on the digital media file. In certain embodiments of the present invention, the digital media device may be a digital camera device and the digital media file may be a digital photograph.

Although embodiments of the present invention are discussed herein with respect to method embodiments, related digital media devices and computer program products are also provided.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as digital media devices, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of devices, methods and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The use of digital media devices, such as digital camera devices, has become commonplace. Organizing digital media files, such as photographs, may not be as easy as sorting and organizing traditional film photographs. Therefore, devices, methods and computer program products for tagging digital photographs are provided according to some embodiments of the present invention. In particular, a digital media file, for example, a digital photograph, may be obtained with a digital media device, such as a digital camera device. One or more event tags may be associated with the digital media file on the digital media device. The event tags identify the digital photographs, for example, the event tag may be descriptive of the digital media file. Thus, according to some embodiments of the present invention, the digital media files may be virtually stacked and stored on the digital media device as will be discussed further herein with respect to FIGS. 1 through 6.

As used herein, "digital media files" refer to digital images, video, audio and/or text files, for example, digital photographs. Furthermore, "digital media devices" refer to any device, such as a digital camera device, capable of producing the digital media files as discussed herein. Although example embodiments of the present invention are substantially discussed herein with respect to digital camera devices, embodiments of the present invention are not limited to this configuration. For example, embodiments of the present invention may used in combination with any type of media files which lend themselves to the teachings discussed herein without departing from the scope of the present invention.

As used herein, a "digital camera device" refers to any device capable of taking digital or electronic photographs. For example, digital camera devices as used herein are not limited to camera devices. The digital camera device function may be included in another device, such as a portable electronic device or mobile terminal, without departing from the scope of the present invention.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer and/or calendar; and/or conventional laptop and/or palmtop computers or other appliances, which include a radio frequency receiver. As used herein, "mobile terminals" may be portable, transportable, installed in a vehicle (aeronautical, maritime, or land-based), or situated and/or configured to operate locally and/or in a distributed fashion at any other location(s) on earth and/or in space.

Figure 1:
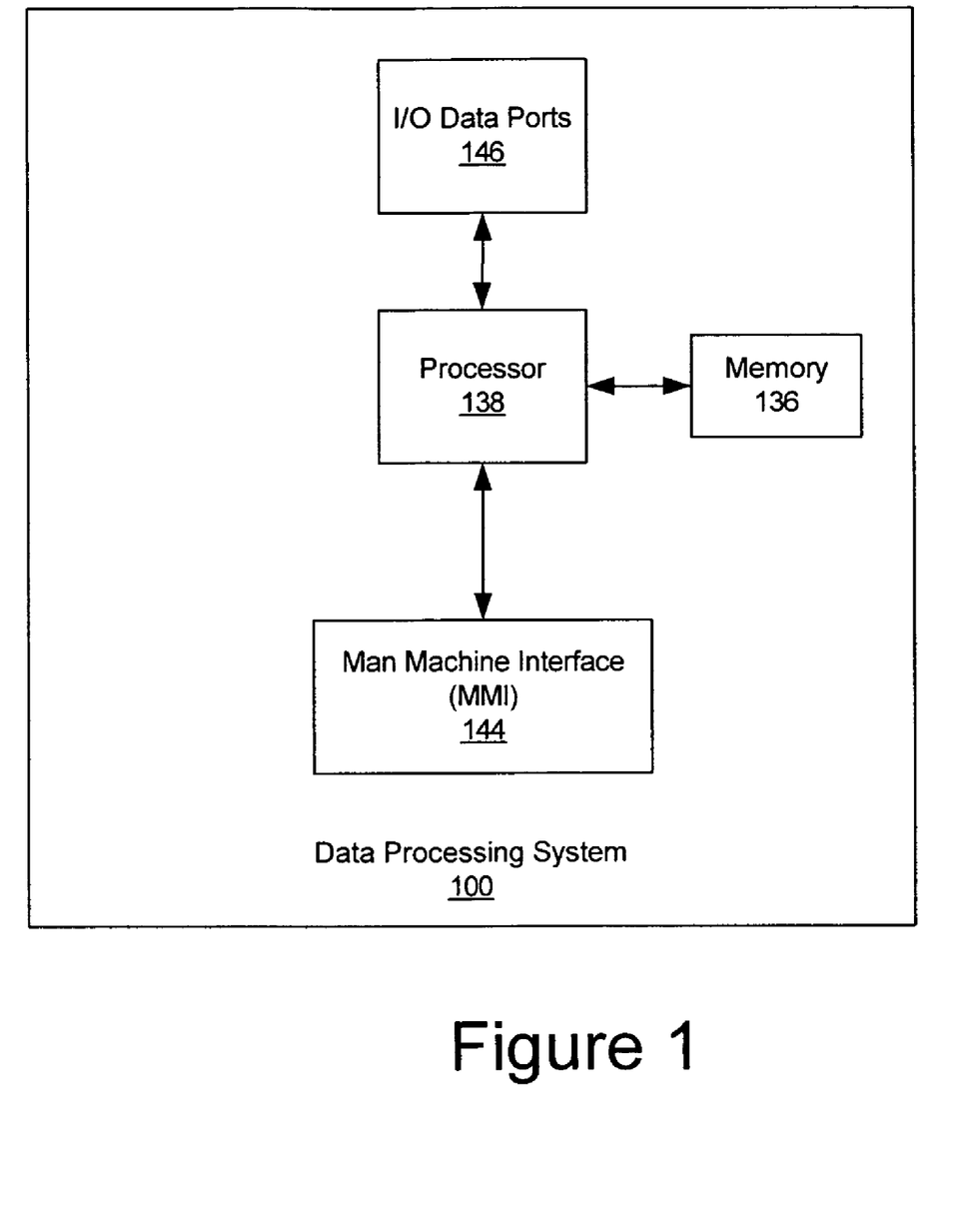
FIG. 1 is a block diagram of a data processing system suitable for use in digital media devices according to some embodiments of the present invention.

Details of various embodiments of the present invention will be discussed below with respect to FIGS. 1 through 6. Referring first to FIG. 1, an exemplary embodiment of a data processing system 100 suitable for use in a digital media device in accordance with some embodiments of the present invention will be discussed. The data processing system 100 typically includes a user interface 144, such as a keyboard, keypad, touchpad or the like, I/O data ports 146 and a memory 136 that communicate with a processor 138. The I/O data ports 146 can be used to transfer information between the data processing system 100 and another computer system or a network. These components may be conventional components, such as those used in many conventional data processing systems, which may be configured to operate as described herein.

Figure 2:
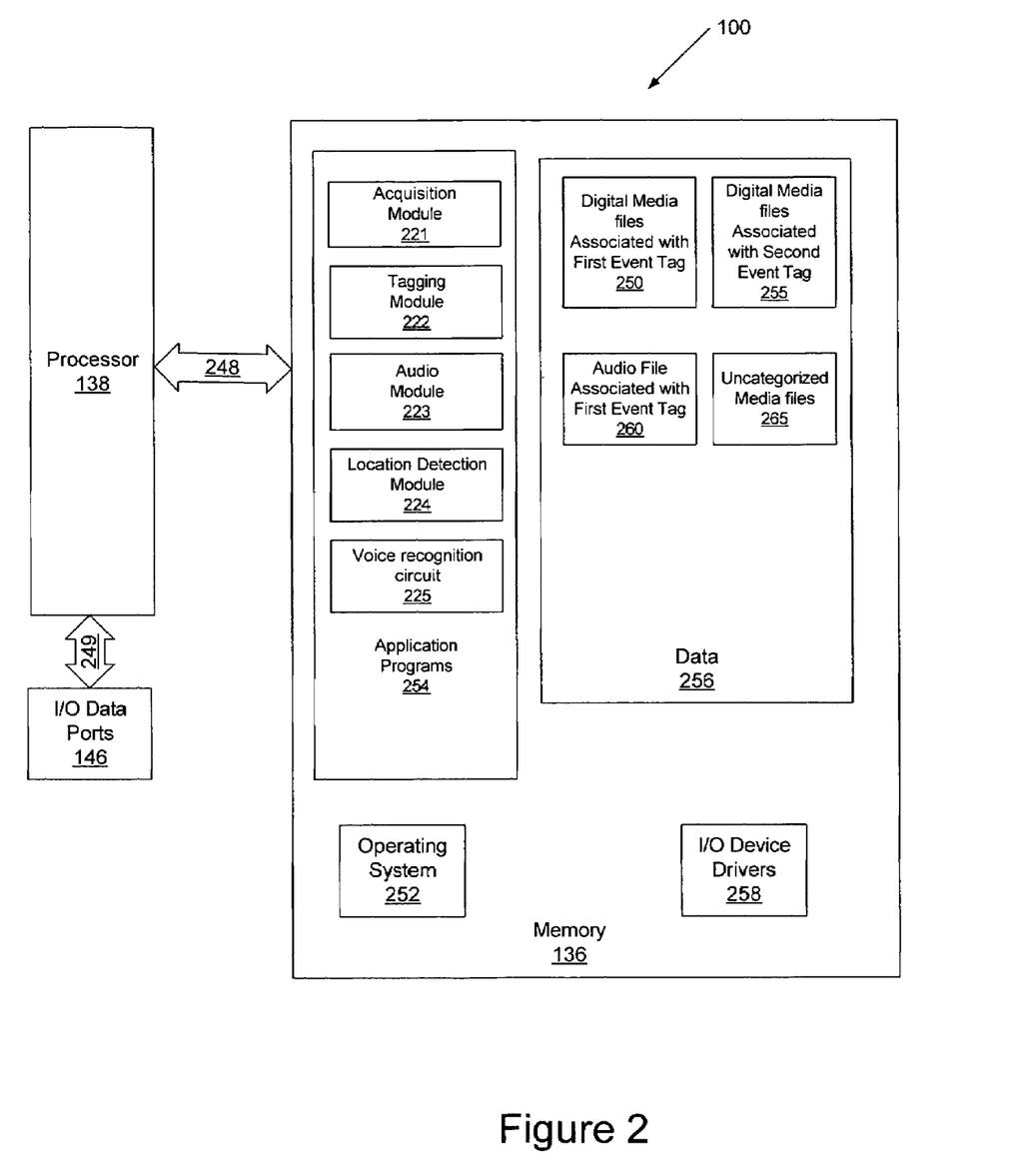
FIG. 2 is a more detailed block diagram of data processing systems according to some embodiments of the present invention.

Referring now to FIG. 2, a more detailed block diagram of the data processing system 100 in accordance with some embodiments of the present invention will be discussed. The processor 138 communicates with the memory 136 via an address/data bus 248 and the I/O data ports 146 via an address/date bus 249. The processor 138 can be any commercially available or custom microprocessor. The memory 136 is representative of the overall hierarchy of memory devices containing the software and data used to implement the functionality of the data processing system 100. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 100: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 100 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

It will be understood that digital media devices according to some embodiments of the present invention may not include an operating system 252 and/or input/output (I/O) device drivers 258 as discussed above. In some embodiments of the present invention, digital media devices may use software in the device configured to run the operations of the device without departing from the scope of the present invention.

As illustrated in FIG. 2, the data 256 according to some embodiments of the present invention may include digital media files associated with a first event tag 250, digital media files associated with a second event tag 255, an audio file associated with the first event tag 260 and uncategorized digital media files 265. The details with respect to this data will be discussed further below.

Although the data 256 only includes two files for digital media files 250 and 255, a single audio file 260 and a single file of uncategorized digital media files 265, embodiments of the present invention are not limited to this configuration. Any number of any of these files may be provided without departing from the scope of the present invention.

As further illustrated in FIG. 2, the application programs 254 may include an acquisition module 221, a tagging module 222, and an audio module 223, a location detection module 224 and a voice recognition circuit 225 according to some embodiments of the present invention. While the present invention is illustrated, for example, with reference to the acquisition module 221, the tagging module 222, the audio module 223, the location detection module 224 and the voice recognition circuit 225 being application programs in FIG. 2, as will be appreciated by those of skill in the art, other configurations may also be utilized while still benefiting from the teachings of the present invention. For example, the acquisition module 221, the tagging module 222, the audio module 223, the location detection module 224 and the voice recognition circuit 225 may also be incorporated into the operating system 252 or other such logical division of the data processing system 100. Thus, the present invention should not be construed as limited to the configuration of FIG. 2, but is intended to encompass any configuration capable of carrying out the operations described herein.

Furthermore, while the acquisition module 221, the tagging module 222, the audio module 223, the location detection module 224 and the voice recognition circuit 225 are illustrated in a single data processing system, as will be appreciated by those of skill in the art, such functionality may be distributed across one or more data processing systems. Thus, the present invention should not be construed as limited to the configuration illustrated in FIGS. 1 through 2, but may be provided by other arrangements and/or divisions of function between data processing systems.

Referring now to FIGS. 1 and 2, a user of the digital media device according to some embodiments of the present invention, may obtain a digital media file, for example, a digital photograph, using the digital media device. Thus, the acquisition module 221 of the digital media device may be configured to obtain the digital media files taken with the digital media device by the user. The tagging module 222 may be configured to associate one or more event tags with the digital media files. A single media file may be associated with one or more event tags as will be discussed further herein. As used herein, an "event tag" is a virtual tag that identifies a category associated with the digital media files having the event tag. For example, a category may be a soccer game, a ballet recital, a Stanley cup hockey game and the like. The event tag may or may not include the name of the event, for example, "soccer game." In some embodiments of the present invention, the tag may merely be a marker that marks a start of a series of one or more digital media files. In still further embodiments of the present invention, the event tag may be a voice tag, such as "chipper jones at bat", which may be used as the event tag.

The tagging module 222 may be configured to associate the digital media file with an event tag before or after the digital media file is obtained. In other words, in some embodiments of the present invention, the user of the digital media device may open an event file and create an associated event tag before any digital media files are obtained with the digital media device, i.e., the tagging module 222 may be configured to open or create a virtual event file in the digital media device. Thus, each digital media file obtained with the digital media device after the event file has been opened will be tagged by the tagging module 222 with the event tag, for example, EV#1, for that particular event, for example, first soccer game of the season. Then, the tagging module 222 may be configured to associate all of the digital media files having an event tag EV#1 and create a virtual file of digital media files associated with the first event tag EV#250.

As used herein, "virtual files" and "virtual memory" refer to files or memory that may only exist in the virtual environment. In other words, these physical files or memory locations may not exist, but are virtually created by associating the digital media files with event tags. Thus, all of the media files associated with the same event tag can be thought of as being stored in a virtual file folder, even though these media files may not be stored next to each other in the memory 136. As discussed above, more than one event tag can be associated with a single media file and, therefore, a single media file may be included in multiple file folders without departing from the scope of the present invention.

In some embodiments of the present invention, the virtual event file may be closed. Once the virtual event file is closed, no digital media files may be moved into this file. Thus, a user should not close a virtual event file before it is complete. It will be understood that there may be more than one open event file on a digital media device at the same time without departing from the scope of the present invention.

In further embodiments of the present invention, digital media files may be randomly obtained by the acquisition module 221 of the digital media device and remain as uncategorized digital media files 265 in the memory 136 of the digital media device. Then, at a later time, the digital media files stored as uncategorized digital media files 265 may be associated with an event tag, for example, the first event tag EV#1 or the second event tag EV#2. The tagging module 222 may be configured to associate the digital media files that are currently uncategorized 265 with the first event tag EV#1 and, thus, place the digital media files in the virtual file of digital media files associated with the first event tag EV#1 250. Similarly, the tagging module 222 may be configured to associate digital media files that are currently uncategorized 265 with the second event tag EV#2 and, thus, place the digital media files in the virtual file of digital media files associated with the second event tag EV#2 255.

In still further embodiments of the present invention, the tagging module may be configured to automatically retrieve event tags when the digital media file is obtained. For example, digital media devices according to some embodiments of the present invention may include a location detection module 224, such as a global positioning system (GPS) module. Thus, when the digital media device acquires a digital media file, the location detection module may attach a location stamp including, for example, GPS coordinates. As discussed above, some embodiments of the present invention may also provide a time stamp associated with the digital media file. The tagging module 222 may then be configured to use the location stamp and the time stamp to locate the appropriate event tag for the digital media file and associate that event tag with the media file automatically, without any user intervention.

In some embodiments of the present invention, the digital media device may include a man machine interface (MMI) (FIG. 1), such as a touch screen, a keypad or a voice recognition circuit 225, which may allow the user to manipulate the digital media files, for example, assign event tags, associate digital media files with other event tags, reorder the presentation of digital media files for playback and the like. For example, a touch screen may be provided on the viewfinder of the digital media device and a menu may be viewable thereon. The user may then select desired action(s) on the menu by touching the desired action(s) thereon.

In some embodiments of the present invention, the user may search the contents of the memory 256 for specific digital media files and/or event (event tags). The search may be performed through an interface on the viewfinder that allows entry of keywords associated, for example, with a specific event or event tag. Accordingly, some embodiments of the present invention may provide non-linear searching capabilities within the digital media device. Furthermore, in some embodiments of the present invention, the digital media device may be equipped with voice recognition software, which may allow a user to search for specific digital media files and/or events by verbally calling out the keywords.

In some embodiments of the present invention, the audio module 223 may be configured to record an audio file associated with one or more digital media files associated with a same event tag. For example, at a baseball game, a user may dictate an audio commentary of the game while taking digital media files with the digital media device. The audio file may then be associated with the same event tag as the digital media files so that the audio file may be in the same virtual file as the digital media files associated with the same event tag. In particular embodiments of the present invention, the event tags may include time stamps associated with the audio file, and the audio module 224 may be further configured to use the time stamps to synchronized content of the audio file with the digital media files associated with the same event tag during playback as will be discussed further below with respect to FIG. 4.

Figure 3A:
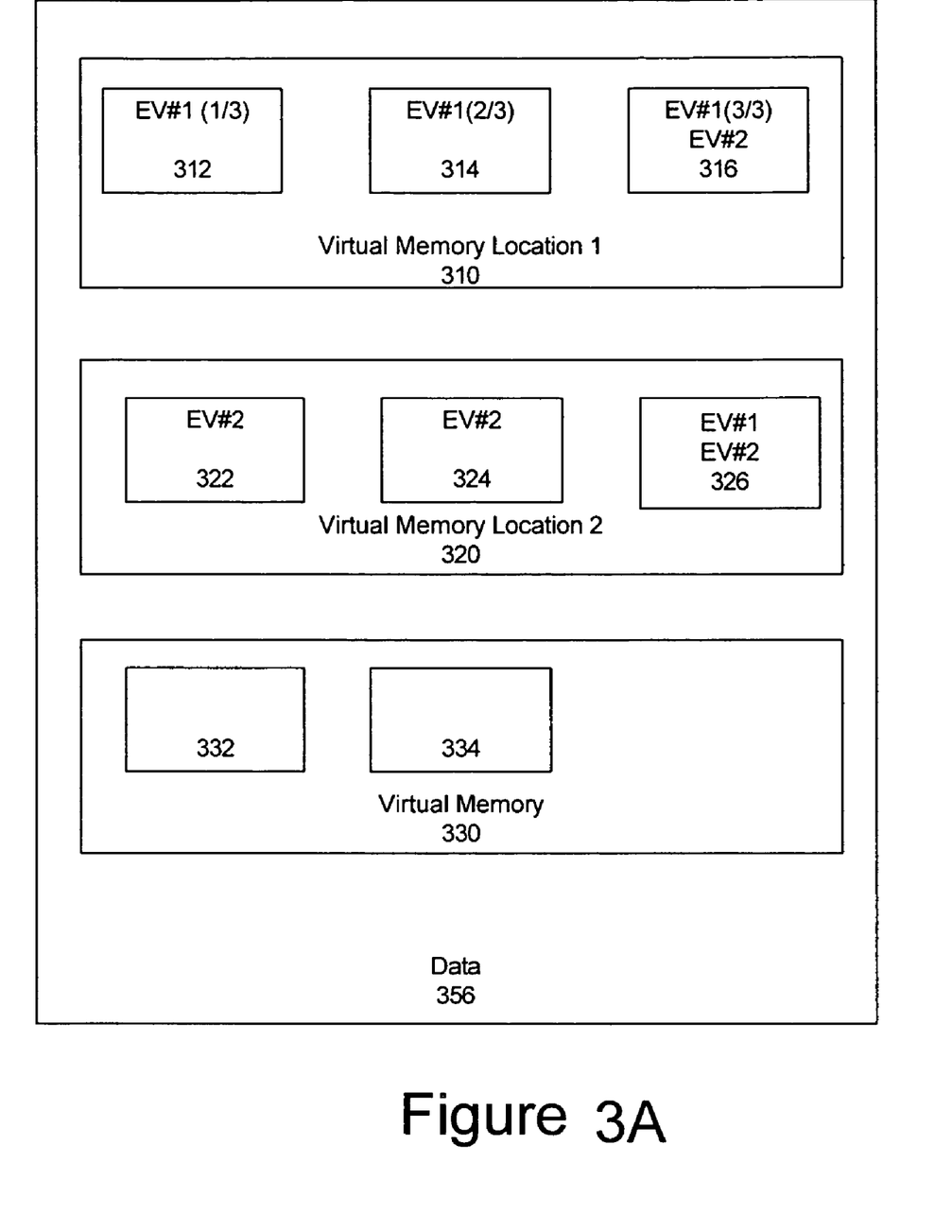
FIGS. 3A and 3B are block diagrams illustrating exemplary media files organized according to some embodiments of the present invention.
Figure 3B:
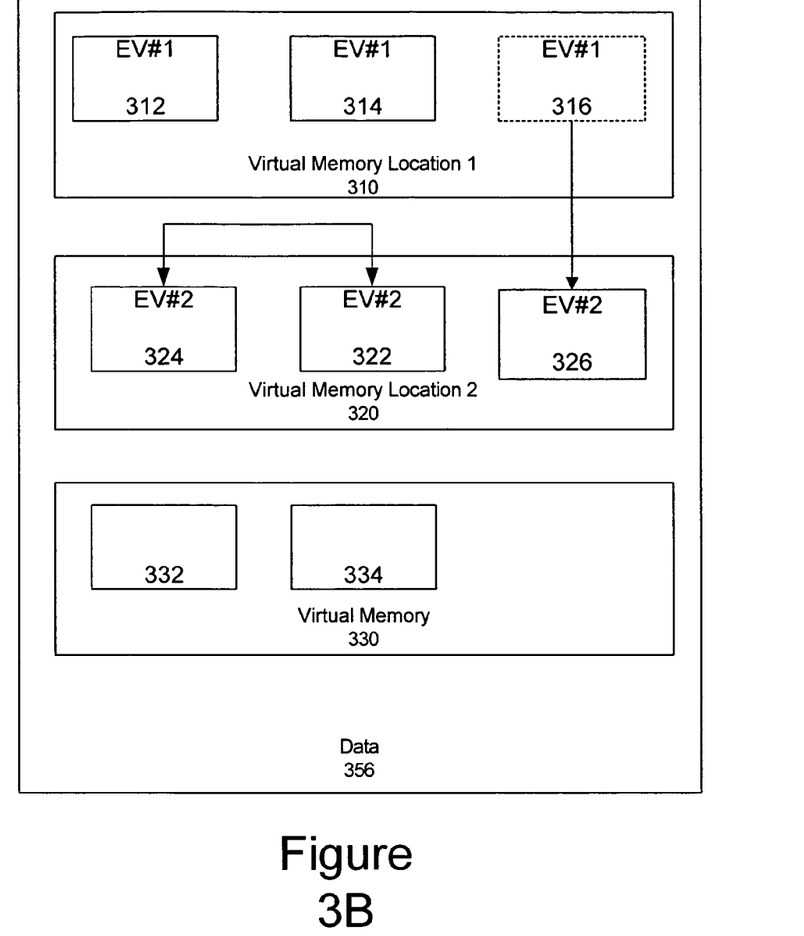

Various embodiments of the data 256 portion of the memory 136 will now be discussed with respect to the block diagrams of FIGS. 3A, 3B and 4. As discussed above, the memory locations discussed with respect to FIGS. 3A and 3B are "virtual" and, therefore, may not actually exist in the memory of the digital media device. The association of event tags with digital media files according to some embodiments of the present invention create a virtual file as discussed above.

As illustrated in FIG. 3A, the data 356 includes first and second virtual memory locations 310 and 320 and other virtual memory 330. The first and second virtual memory locations 310 and 320 can be thought of as virtual files or file drawers in which photographs or media having the same event tag, for example, EV#1 or EV#2, are stored. In particular, the first virtual memory location 310 includes three digital media files 312, 314 and 316 having the same event tag EV#1. This event tag could be associated with any type of event, for example, a baseball game, a play, a family outing or the like. Furthermore, as illustrated in FIG. 3A, the third digital media file 316 is also associated with the second event tag EV#2. Thus, the third digital media file may exist in two virtual files. A single digital media file may be associated with multiple event tags as discussed above.

Similarly, the second virtual memory location 320 includes three digital media files 322, 324 and 326 having the same event tag EV#2. As further illustrated, the third digital media file 326 is also associated with the first event tag EV#1. Furthermore, other virtual memory 330 is also provided in the data 356, which includes uncategorized digital media files 332 and 334, i.e., digital media files with no associated event tag. It will be understood that the uncategorized digital media files 332 and 334 may at some time in the future be associated with an event tag and therefore have a virtual memory location.

Furthermore, some embodiments of the present invention may be configured to provide dates associated with the uncategorized digital media files 265. For example, the date the first digital media file was obtained and the date the last digital media file was captured. When there is, for example, a twenty-four hour break between obtaining digital media files in the uncategorized digital media file 265, the user may be prompted to close the folder. In some embodiments of the present invention, the folder may be closed automatically upon lapse of a predetermined amount of time. Thus, there may be multiple uncategorized digital media files without departing from the scope of the present invention.

As further illustrated in FIG. 3A, the digital media files, for example, digital media files 322, 324 and 326, may include a visual indication of the event tag (EV#2) associated therewith so as to allow the user to identify the associated event by looking at the digital media file. In some embodiments of the present invention, the digital media files may also include a visual indication of the total number of digital media files associated with the event tag and each individual digital media file may include a visual indication of where that particular digital media file falls in the sequence of digital media files associated with that event tag. For example, as illustrated in FIG. 3A, each of the digital media files 312, 314 and 316 have an associated ratio 1/3, 2/3 and 3/3, respectively. In other words, there are 3 total digital media files associated with the event tag EV#1 and digital media file 312 is the first of the three, digital media file 314 is the second of the three and digital media file 316 is the third of the three.

It will be understood that although the first and second virtual memory locations only include three digital media files and the other virtual memory location only includes two digital media files, embodiments of the present invention are not limited to this configuration. For example, any number of digital media files may be associated with each virtual memory location without departing from the scope of the present invention.

Referring now to FIG. 3B, the event tags associated with digital media files may be changed. In particular, as illustrated in FIG. 3B, the digital media file 316 associated with the first event tag EV#1 may be associated with the second event tag EV#2 and, therefore, may be included in the second virtual memory location 320 where it is renamed digital media file 326 associated with the second event tag EV#2. As further illustrated in FIG. 3B, the order of the digital media files may also be altered for playback. As illustrated, digital media files 324 and 322 have swapped locations in virtual memory location 320.

It will be understood that in some embodiments of the present invention a single event file may be split into two or more event files. For example, an event tag for a baseball game may be associated with all digital media files acquired at the game and all of the digital media files may be stored in a single virtual event file. After the fact, the virtual event file including all of the digital media files from the game may be split into 9 different virtual event files, one for each inning.

As discussed above, in some embodiments of the present invention a user may create an audio file associated with digital media files having a particular event tag. For example, the user may dictate a play by play of the baseball game, for example, who is at bat, whether they get on base and the like. The user may also take digital media files corresponding to this commentary, for example, a digital media file of the player at bat, running to first base and being tagged out. Thus, according to some embodiments of the present invention, the digital media files may include an associated time stamp, which may be used to coordinate the digital media files with the audio file during playback.

Figure 4:
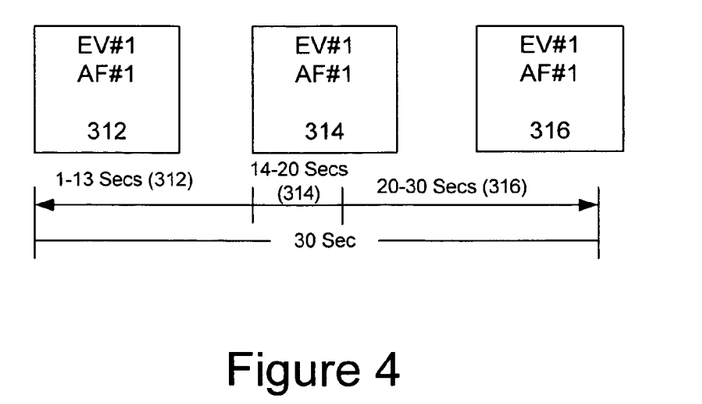
FIG. 4 is a block diagram illustrating playback of an audio file associated with an event tag according to some embodiments of the present invention.

In particular, as illustrated in FIG. 4, an audio file may not be distributed equally over the digital media files to which it corresponds. For example, if you have a 30 second audio file, seconds 1-13 of the audio file may apply to the first digital media file 312, seconds 14-20 may apply to the second digital media file 314 and seconds 20-30 may apply to the third digital media file 316. The audio module 224 may be configured to use the time stamp associated with the digital media files to coordinate the audio file with the digital media files. The number of digital media files and length of the audio file discussed above with respect to FIG. 4 are provided for exemplary purposes only and, thus, embodiments of the present invention are not limited to the details discussed therein. Thus, according to some embodiments of the present invention, the digital media files 312, 314 and 316 may be played back as a slideshow including audio commentary. This slideshow may be viewed on the digital media device or a separate device without departing from the scope of the present invention.

In some embodiments of the present invention, when an audio file is associated with more than one digital media file, the audio file and the group of digital media files may stay together unless broken apart. In these embodiments, the group of digital media files may all include a symbol (AF#1—FIG. 4) indicating that the media file is part of the group of media files associated with the audio file.

In some embodiments of the present invention, the audio file may be attached to the media files automatically. For example, some digital media devices according to some embodiments of the present invention may be configured with a start/stop mode. When started, the audio is recorded and associated with any digital media files acquired until the stop command is received. Thus, automatically attaching the audio file to the digital media files acquired during that time period.

Figure 5:
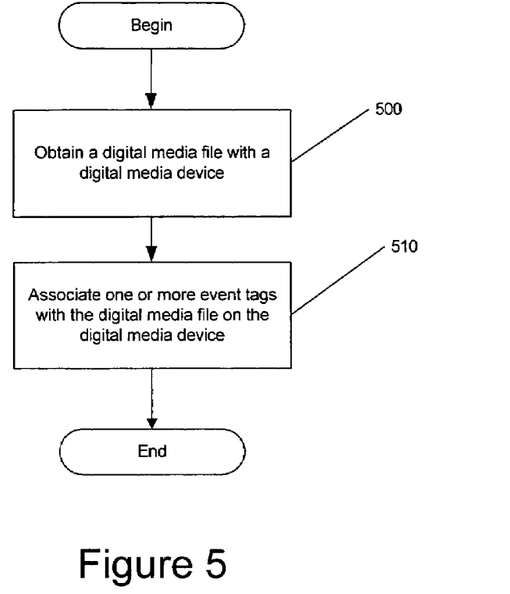
FIGS. 5 and 6 are flowcharts illustrating operations for tagging digital media files in a digital media device according to various embodiments of the present invention.
Figure 6:
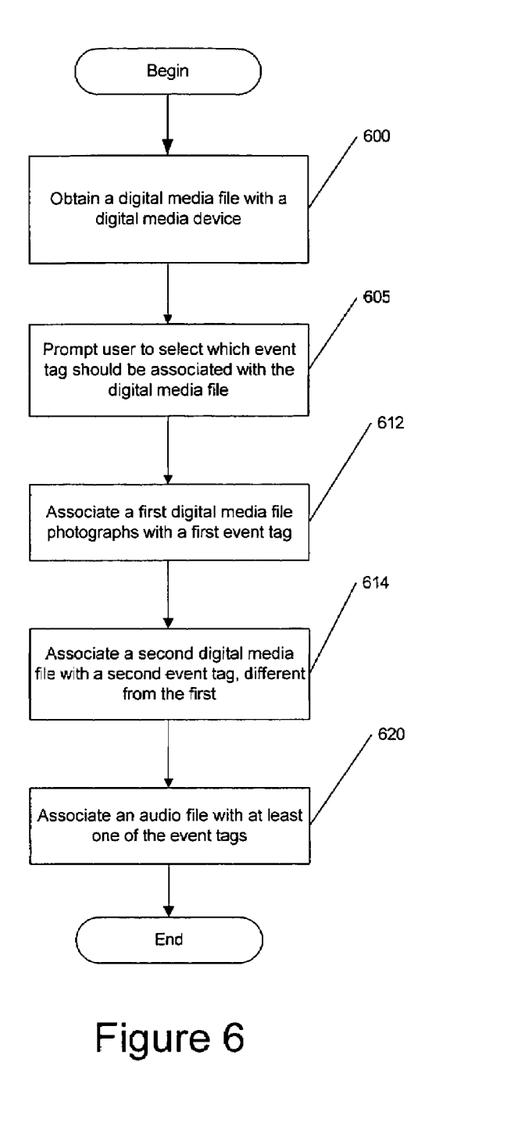

Operations according to some embodiments of the present invention for categorizing digital media files taken with a digital media device will now be discussed with respect to the flowcharts of FIGS. 5 and 6. Referring first to the flowchart of FIG. 5, operations begin at block 500 by obtaining a digital media file with a digital media device. In other words, a user of, for example, a digital camera device, may take a photograph. One or more event tags are associated with the digital media files on the digital media device (block 510). The event tags identify categories for the digital media files. For example, an event tag may identify digital media files taken at a baseball game, ballet recital, professional sporting event or the like. The "event", the game, recital, sporting event, is given an event tag, for example, EV#1 or EV#2, and each of the digital media files associated with the event are assigned this event tag.

Operations according to further embodiments of the present invention will now be discussed with respect to the flowchart of FIG. 6. Referring to FIG. 6, operations begin at block 600 by obtaining digital media files with a digital media device. At some point, either before the digital media file is taken or after the digital media file is taken, a user may be prompted to select event tags to be associated with the digital media files (block 605). For example, A first digital media file may be associated with a first event tag that identifies a first category or event, for example, a baseball game (block 612). Similarly, a second digital media file may be associated with a second event tag that identifies a second category or event, different from the first category, for example, a ballet recital (block 614). In some embodiments of the present invention a visual indication of the event tags associated with the two or more digital media files may be provided on the two or more digital media files. Thus, the user can determine which event a digital media file belongs to by locating the event tag on the digital media file itself.

It will be understood that digital media files may be associated with one or more event tags without departing from the scope of the present invention. Furthermore, the event tag association of the digital media files may be changes, for example, from a first event tag to a second event tag. According to some embodiments of the present invention, events may be split into two or more events, digital media files may be reordered within an event and the like without departing from the scope of the present invention. For example, if a user has created a single event for an entire baseball game, the user may then divide that single event into 9 events, one for each inning of the baseball game.

In some embodiments of the present invention, digital media files associated with a same event tag on the digital media device may be associated with an audio file associated with the same event tag (block 620). The event tags may include time stamps associated with the audio file. The time stamps may allow the two or more digital media files associated with the same event to be synchronized with content of the audio file during playback. The digital media files and the associated audio file may be played back on, for example, the viewfinder of the digital media device. For example, the digital media device may be equipped with a media viewer, for example, Windows Media.

Furthermore, in some embodiments of the present invention, the digital media files and the audio file associated with the same event tag may be loaded onto an external device, such as a personal computer or laptop, and displayed thereon. Furthermore, the combination of digital media files/audio file may be converted to another format without departing from the scope of the present invention.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method for tagging a digital media file, comprising:
   obtaining at least two digital media files with a digital media device;
   presenting a user of the digital media device with a first option of associating the at least two digital media files with one of a plurality of event tags, wherein the user is presented with the first option of associating the at least two digital media files with one of the plurality of event tags on the digital media device without connecting the digital media device to a communications network;
   receiving, at the digital media device, a first selected event tag of the plurality of event tags to be associated with the at least two digital media files;
   associating the first selected event tag with the at least two digital media files on the digital media device responsive to the first selected event tag without connecting the digital media device to the communications network, the first selected event tag identifying the at least two digital media files on the digital media device; and
   associating the at least two digital media files with an audio file associated with the first selected event tag,
   wherein the first selected event tag includes a time stamp associated with the audio file, the time stamp allowing the at least two digital media files to be synchronized with content of the audio file during playback; and
   wherein the at least two digital media files include a visual indication of the audio file associated with the first selected event tag on the at least two digital media files.

2. The method of claim 1, wherein obtaining the at least two digital media files with a digital media device comprises obtaining a first digital media file and a second digital media file, the method further comprising:
   obtaining a third digital media file with the digital media device;
   presenting the user of the digital media device with a second option of associating the obtained third digital media file with one of the plurality of event tags;
   receiving, at the digital media device, a second selected event tag of the plurality of event tags to be associated with the third digital media file, the second selected event tag being different from the first selected event tag associated with the first and second digital media files; and
   associating the third digital media file with the second selected event tag to be associated with the third digital media file, the second selected event tag to be associated with the third digital media file identifying a different category of digital media files from a category of media files identified by the first selected event tag associated with the first digital media file and the second digital media file.

3. The method of claim 1, further comprising providing a second visual indication of the first selected event tag associated with the at least two digital media files on the at least two digital media files.

4. The method of claim 1, wherein the digital media device comprises a digital camera device and wherein the at least two digital media files comprise at least two digital photographs.

5. A digital media device configured to tag digital media files, comprising:
   an acquisition module in the digital media device and configured to obtain at least two digital media files; and
   a tagging module configured to:
   present a user of the digital media device with a first option of associating the at least two digital media files with one of a plurality of event tags, wherein the user is presented with the first option of associating the at least two digital media files with one of the plurality of event tags on the digital media device without connecting the digital media device to a communications network;
   receive, at the digital media device, a first selected event tag of the plurality of event tags to be associated with the at least two digital media files;
   associate the first selected event tag with the at least two digital media files on the digital media device without connecting the digital media device to the communications network responsive to the first selected event tag, the first selected event tag identifying the at least two digital media files on the digital media device; and
   an audio module configured to associate the at least two digital media files associated with the first selected event tag with an audio file associated with the first selected event tag, wherein the first selected event tag includes a time stamp associated with the audio file; and
   wherein the audio module is further configured synchronize the at least two digital media files with the audio file associated with the first selected event tag during playback using the time stamp.

6. The device of claim 5:
   wherein the at least two digital media files comprise a first digital media file and a second digital media file;
   wherein the acquisition module is further configured to obtain a third digital media file; and
   wherein the tagging module is further configured to:
   present the user of the digital media device with a second option of associating the third digital media file with one of the plurality of event tags;
   receive, at the digital media device, a second selected event tag of the plurality of event tags to be associated with the third digital media file, the second selected event tag being different from the first selected event tag associated with the first digital media file and the second digital media file; and
   associate the third digital media file with the second selected event tag to be associated with the third digital media file, the second selected event tag to be associated with the third digital media file identifying a different category of digital media files from a category of media files identified by the first selected event tag associated with the first digital media file and the second digital media file.

7. The device of claim 5, wherein the digital media device comprises a digital camera device and wherein the at least two digital media files comprise at least two digital photographs.

8. A computer program product for tagging digital media files on a digital media device, the computer program product comprising:
   a non-transitory computer readable storage medium having computer readable program code embodied in said medium, the computer readable program code comprising:
   computer readable program code configured to obtain at least two digital media files with the digital media device;

computer readable program code configured to present a user of the at least two digital media files with a first option of associating the at least two digital media files with one of a plurality of event tags, wherein the user is presented with the first option of associating the at least two digital media files with one of the plurality of event tags on the digital media device without connecting the digital media device to a communications network;

computer readable program code configured to receive, at the digital media device, a first selected event tag of the plurality of event tags to be associated with the at least two digital media files;

computer readable program code configure to associate the first selected event tag with the at least two digital media files on the digital media device without connecting the digital media device to the communications network, the first selected event tag identifying the at least two digital media files on the digital media device; and computer readable program code configured to associate the at least two digital media files associated with the first selected event tag with an audio file associated with the first selected event tag, wherein the first selected event tag includes a time stamp associated with the audio file, the time stamp allowing the at least two digital media files to be synchronized with content of the audio file associated with the first selected event tag during playback.

9. The computer program product of claim 8:

wherein the computer readable program code configured to obtain the at least two digital media files with a digital media device comprises computer readable program code configured to obtain a first digital media file and a second digital media file, the computer program product further comprising:

computer readable program code configured to obtain a third digital media file with the digital media device;

computer readable program code configured to present the user of the digital media device with a second option of associating the third digital media file with one of the plurality of event tags;

computer readable program code configured to receive, at the digital media device, a second selected event tag of the plurality of event tags to be associated with the third digital media file, the second selected event tag being different from the first selected event tag associated with the first digital media file and the second digital media file; and computer readable program code configured to associate the third digital media file with the second selected event tag to be associated with the third digital media file, the second selected event tag to be associated with the third digital media file identifying a different category of digital media files from a category of media files identified by the first selected event tag associated with the first digital media file and the second digital media file.

* * * * *

UNITED STATES PATENT AND TRADEMARK OFFICE
CERTIFICATE OF CORRECTION

| | | |
|---|---|---|
| PATENT NO. | : 8,027,561 B2 | |
| APPLICATION NO. | : 11/509286 | |
| DATED | : September 27, 2011 | |
| INVENTOR(S) | : Malik et al. | |

It is certified that error appears in the above-identified patent and that said Letters Patent is hereby corrected as shown below:

Column 11, Claim 2, Line 45: Please correct "the obtained third" to read -- the third --

Signed and Sealed this
Third Day of January, 2012

David J. Kappos
*Director of the United States Patent and Trademark Office*